United States Patent
Beukers et al.

(10) Patent No.: US 6,176,386 B1
(45) Date of Patent: *Jan. 23, 2001

(54) PRESSURE-RESISTANT VESSEL

(75) Inventors: Adriaan Beukers, Heemstede; Theo De Jong, Nieuwkoop, both of (NL)

(73) Assignee: Advanced Lightweight Constructions Group B.V. (NL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/068,397

(22) PCT Filed: Nov. 8, 1996

(86) PCT No.: PCT/NL96/00437

§ 371 Date: Oct. 28, 1998

§ 102(e) Date: Oct. 28, 1998

(87) PCT Pub. No.: WO97/17570

PCT Pub. Date: May 15, 1997

(30) Foreign Application Priority Data

Nov. 8, 1995 (EP) .................................................. 95203044

(51) Int. Cl.[7] .................................................. B65D 88/12
(52) U.S. Cl. ........................ 220/562; 220/566; 220/567.2; 220/589
(58) Field of Search ..................................... 220/562, 563, 220/564, 566, 567.2, 581, 582, 586, 590, 589, 588

(56) References Cited

U.S. PATENT DOCUMENTS

| | | | |
|---|---|---|---|
| 3,100,518 | * | 8/1963 | Dresser . |
| 4,566,609 | * | 1/1986 | Hoffmeister ......................... 220/590 |
| 4,582,211 | * | 4/1986 | Mandel ................................ 220/566 |
| 4,711,284 | * | 12/1987 | Schmidt . |
| 5,407,092 | * | 4/1995 | Hardgrove et al. .................. 220/590 |
| 5,480,260 | * | 1/1996 | Shattuck et al. . |

* cited by examiner

*Primary Examiner*—Stephen Castellano
(74) *Attorney, Agent, or Firm*—Michaelson & Wallace; Peter L. Michaelson

(57) ABSTRACT

A wheel-shaped pressure-resistant vessel for storing gaseous, liquid or liquefied fuel and which has a substantially rigid shape. Specifically, the vessel contains a substantially continuous shell of a fiber-reinforced resin. The shell has a central opening, an inner lining and an axial reinforcement member. The shell has a substantial mechanical equilibrium shape such that the axial member is situated in a central opening. The axial member contains an inner member and two end plates, with each of the end plates fixing the shell to the inner member. Further, the axial member is attached, through both end plates, to the shell such that outer surfaces of the shell are pulled towards each other, thus reinforcing the vessel and maintaining the vessel, even while it is pressurized, in its wheel-like shape.

14 Claims, 3 Drawing Sheets

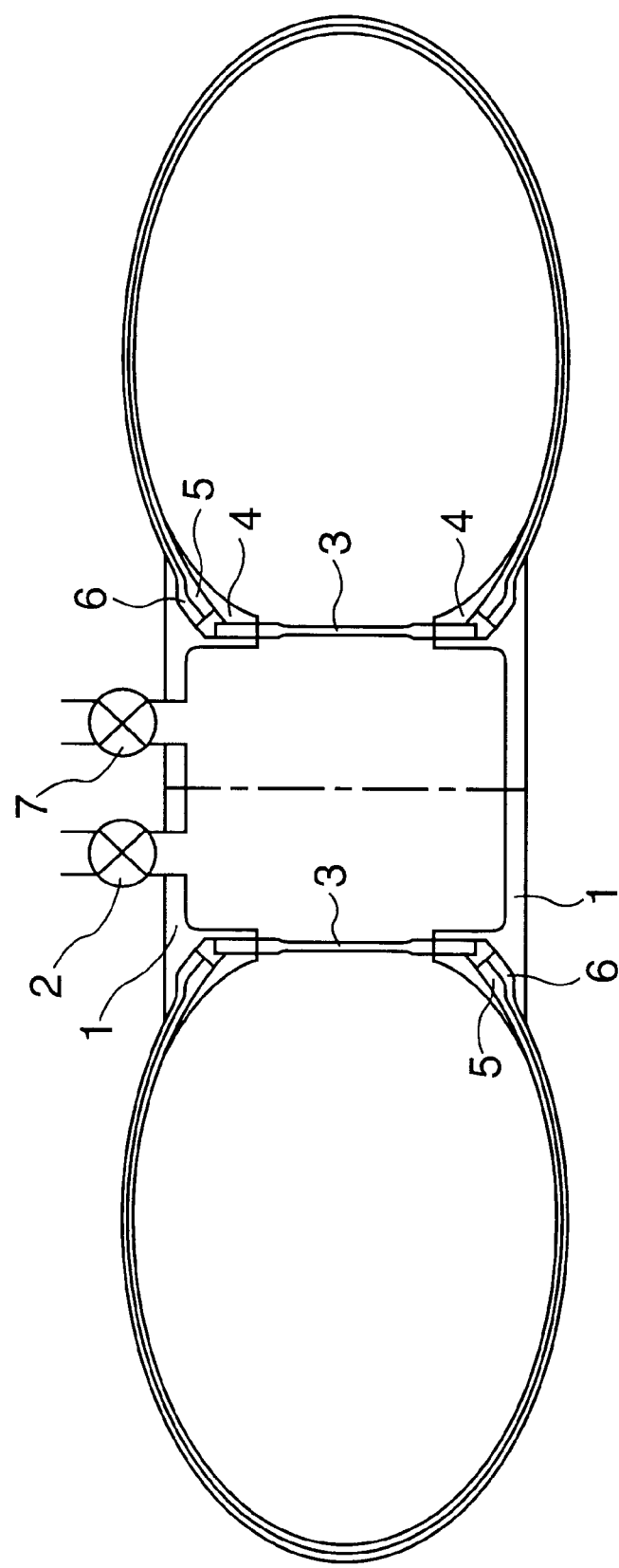

PRESSURE-RESISTANT VESSEL

Figure 1:
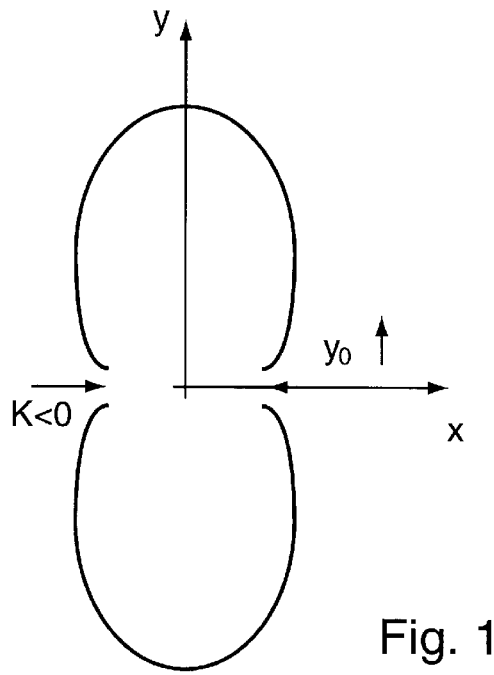

The present invention is directed to a pressure vessel for gaseous, liquefied or liquid materials and the like.

Pressure resistant vessels have been in use for numerous applications, one of them being the use as an LPG-container for automotive purposes. LPG is an interesting fuel for automotive purposes, i.a. due to the low price and low emission of environmentally harmful substances; hence, its use thereof has increased substantially over the last decades. However, LPG is a material that has been liquified through pressurization, with the consequence that the requirements for safety are very high. In view of their relatively low costs, generally steel pressure tanks are used for storage of LPG, the pressure tanks generally being substantially cylindrical and having torispherical domes.

A distinct disadvantage of these LPG containers is their weight and the amount of space they require in a car. In the smaller (compact) cars this weight and especially the amount of space required makes the use of LPG, as fuel, rather unattractive.

It is an object of the invention to provide a pressure vessel having a relatively low weight, and a shape which makes it better suitable for automotive applications. Another object is to provide a pressure vessel which may be used by a person carrying the vessel, for example on the back.

The invention is based on the development of a wheel shaped vessel, which vessel may have the size of a spare car wheel and which will fit in the area provided for the spare wheel.

The invention is accordingly directed to a wheel shaped pressure resistant vessel for gaseous, liquid or liquefied material having a substantially rigid shape, the vessel comprising a substantially continuous shell of a fiber reinforced resin having a central opening, an inner lining and an axial member, the substantially continuous shell having a substantial mechanical equilibrium shape, whereby the axial member is present in the central opening of the shell.

A preferred embodiment of the invention provides a wheel shaped pressure resistant vessel, comprising a substantially continuous shell of a fiber reinforced elastomeric resin having a central opening, a gas tight, substantially rigid inner lining and an axial member, the substantially continuous shell having a substantial mechanical equilibrium shape, whereby the axial member is present in the central opening of the shell and is attached to the rims of the central opening, thereby closing the central opening.

The shell is comprised of a fiber reinforced resin body. The fibers have been wound along substantially geodetical lines, and the shape of a vessel is designed so that the load is substantially equal everywhere in the fibers (more or less isotensoid). Preferably a combination of relatively stiff fiber re-inforcement and flexible matrix material is chosen, resulting therein, that the design, production and use of the vessel is very tolerant of deviations and stress-concentrations. Deviations of geodetics and/or continuity become possible to a certain extent, provided the structural integrity is maintained.

The so-called "netting" theory has been used for this design. This theory assumes that in case of the use of stiff fibers in a non-rigid (such as elastomeric) matrix, the influence of the matrix may be discounted for calculating the forces in a system of fibers of a wound construction. This theory is valid when the stiffness of the matrix is negligibly small compared to the stiffness of the fibers. A theoretical report on the development of pressure bodies using the netting theory can be found in the report of the Technical University of Delft, The Netherlands, report VTH 166 (the "VTH-166 report"), which is incorporated herein by reference.

Winding the substantially continuous fiber reinforcement along a substantially rotation symmetrical body results then in an equilibrium shape that is non-spherical, preferably approximately elliptical, and determined by the form parameter q as defined in the VTH-166 report. In view of the applicability of analytical methods, such as the netting theory to the present invention, which is justified by the difference in stiffness between the fibers and the matrix, the use of continuous fibers for the winding of the body will lead to the situation where the tension in all the fibers is substantially equal throughout the body (isotensoid).

The shape and size of the vessel is determined by the following differential equation (See also FIG. 1)

$$\frac{dX}{dY} = \pm \frac{\sqrt{a^2(Y^2-1)-(Y^3+kY)^2}}{Y^3+kY} \quad \text{wherein}$$

$$X = \frac{x}{y_0}, Y = \frac{y}{y_0}, a = \frac{nF}{\pi p y_0^2}, k = \frac{K}{\pi p y_0^2}$$

F Tension force in the fibres
K axial load on the poles of the vessel
X,Y dimensionless co-ordinate axis
x,y co-ordinate axis
a constant; describes relation between internal pressure and number of fibers
k constant; describes relation between internal pressure and polar load
n number of yarns in cross-section
p internal pressure
$y_0$ polar opening radius An inflatable body of a somewhat comparable shape has been disclosed in EP-A 626,338, the contents of which is incorporated herein by reference. The essential differences between this known body and the present invention are, among others, the requirement of a rigid shape, preferably provided by the lining and the axial member.

The vessel of the present invention may have different constructions, depending on the materials used and the actual requirements on the size, shape and strength.

An essential requirement is that the vessel is rigid. This means, that either the shell is rigid, or that the inner lining is rigid. In this context the term rigid is understood to mean, that without internal pressure, the shape of the vessel is substantially maintained.

The shell, prepared from fiber reinforced resin, can either be rigid or flexible. In a preferred embodiment the shell is prepared from an elastomeric resin, such as a vulcanised or thermoplastic rubber.

The inner lining may also be rigid or thermoplastic. In case the shell is flexible it is essential that the lining is rigid. Otherwise, the selection may be made based on criteria of construction and gas permeability.

The axial member may have two functions in the pressure vessel according to the invention. In the first place this member may provide the necessary means for attachment of all accessories or appliances that are required for the actual use as a pressure vessel, e.g., a valve for filling/emptying the tank and, if desired, apparatus for measuring pressure of the fuel contained within the tank and/or determining a degree to which the tank is filled with fuel; and. It is for example possible to accommodate all said means inside the axial member, or on top thereof. In the second place, and this is much more important, the axial member provides the necessary axial reinforcement of the vessel, by providing a link between the two surfaces of the shell, thus closing the vessel, and pulling the two surfaces together. This latter effect is very important in terms of the shape of the vessel. Without the link the shape would become too much of a balloon to be suitable for use.

Figures 2A, 2B, 2C:
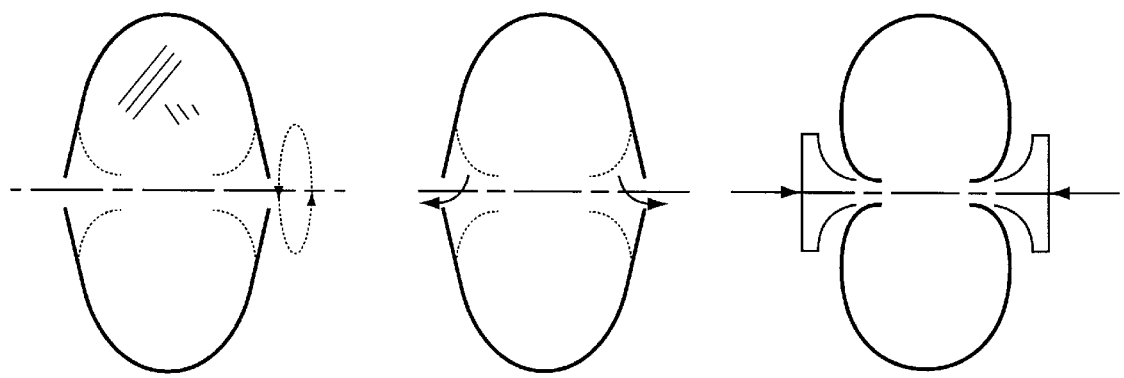
Figure 4:
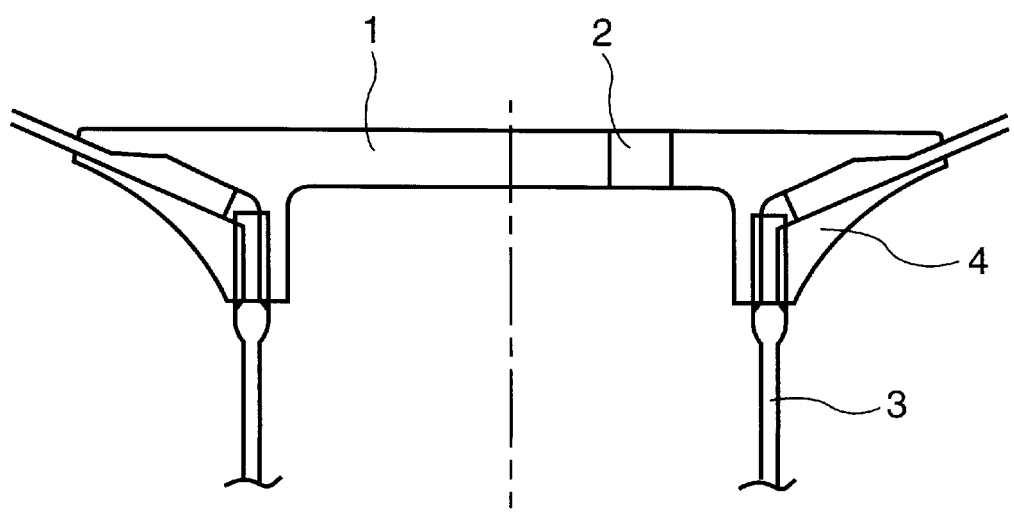

This axial member may be provided by a separate element, such as disclosed in FIGS. 2a and 4, or by winding the fiber reinforcement through the opening in the vessel.

According to a preferred embodiment the axial member does not extend beyond planes defining the outermost surface of the shell of the pressure vessel. Thereby the rim of the central opening in the shell is pulled inward, thus creating an actual wheel like shape.

The vessel body has a geometrically continuous shape and substantially no stress concentrations occur, with the exception in the area where the axial reinforcement member holds the two surfaces together. The shape of the body contains substantially no discontinuities in the mathematical sense, with the exceptions discussed above.

To enable the vessel to hold gases or liquids, a gas-tight inner lining is present. This lining is preferably substantially rigid, thus providing the required shape to the pressure vessel. The material of the inner lining will be selected in relation to the intended application. Of course the material has to be gas tight at the thickness used, which means that an amount of gas passing through it should not exceed the criteria of the applicable laws and regulations. Suitable values thereof are less than 10 ml/h, independent of surface area.

Furthermore, the material must be resistant to chemical influences of the gas or liquid. Finally, it must be able to withstand external forces, that could be exerted on the vessel, such as crash-loads, penetration, indentation and the like. Suitable materials for the inner lining are e.g, the various non-elastomeric ethylene and propylene polymers, PVC and copolymers, as well as metals, such as steel or aluminium.

To protect the vessel against foreign objects, damage, wear, environmental influences, chemicals, such as oils, acids, lye, fats and the like, a protective outer lining may be used. Preferably, this outer lining is able to withstand mechanical and thermal abuse without early collapse.

The pressure vessel according to the invention may be used as an LPG container for automotive use, as discussed hereinabove, but also for other applications wherein pressure vessels can be useful. Examples thereof are lightweight, crash resistant pressure vessels, for example for holding hazardous gases or liquids under high pressure, such as gaseous, liquefied or liquid propellants in the aerospace industry. Other applications can include storage of oxygen or air for rescue workers, fuel for cooking or other equipment, cryogenic storage (provided a suitable isulation is present, for example in the form of a foam between two walls in a double walled vessel), fire extinguishing liquids or gases, and the like.

The vessel can be fire proof by the choice of the materials of construction thereof, or by the use of suitable fire proofing additives or barriers therein.

The pressure that the vessel can withstand depends on the construction thereof, and more in particular, on the fiber density in the shell. Generally, the vessel can withstand pressures from little above atmospheric to more than 100 bar, for example, up to 400 bar.

The fabrication of the fiber reinforced resin body can take place in various ways. A suitable method is winding a pre-impregnated fiber around the rotation symmetric core (for example the rigid inner lining), optionally followed by further impregnation of the final fiber reinforcement with the resin and solidification and/or vulcanization. However, it is also possible to apply a resin matrix to the substantially rotation symmetric core prior to the winding of the fibers and/or after the winding of the fibers. After the fiber reinforcement has been wound around the core, the core is removed. This can be done by using a core that collapses in parts, by a temporary core composed of loosely bound solids, a core of hardened glass, which may be broken and removed after production, or an inflatable core.

In order to provide the required shape in the area of the inner rim of the shell, the shape of the lining preferably deviates somewhat from the theoretical equilibrium shape. As has been shown in FIG. 3, the surface extends somewhat outwardly, thus enabling the attachment of the axial member, after the extending part has been inverted inside.

After the fiber reinforcement body has been wound, woven or braided, it can be incorporated in a resin matrix. It is also possible to wind resin-impregnated fibers, which results in the forming of the resin matrix. In a preferred embodiment, the shell is produced by first applying a layer of resin material on the body, preferably an elastomer, subsequently winding one or more layers of fibers (strands) around this body, preferably two layers, and finally again applying a final layer, a resistance layer, over the final layer of fibers.

The matrix can then be solidified, for example by vulcanization.

The fiber reinforcement can be constructed from various materials, generally comprising natural or synthetic organic or inorganic fibers, although the well-known aramid fibers, such as Kevlar (TM) and Twaron (TM) are suitable choices. Those fibers provide sufficient tensile stiffness in combination with strength. Other suitable fibers are all those fibers with a high tensile strength and/or stiffness, like sisal, carbon fibers, E-, R- and S-glass fibers, and those polymeric fibers which are suitable in the environments where the vessels are used, such as the high molecular weight polyethylene fibers, polyester fibers and other fibers from high quality plastics (engineering plastics).

The matrix resin material of the shell may be elastomeric or rigid. Preferably, the shell is prepared from a fiber reinforced resin selected from the group of elastomeric, thermoplastic elastomeric, thermosetting and thermoplastic, non-elastomeric resins. As to the elastomer matrix, any suitable elastomer can be used, although it is preferred that a high quality elastomer having a good resistance against environmental degradation, such as ozone resistance, is used. Suitable elastomers are, for example, the isoprene, polyurethane, styrene-butadiene, butadiene-nitrile, EP(D)M, polybutadiene and silicone elastomers, which are optionally vulcanized after the body has been shaped. The most preferred elastomer, especially for use as an LPG container is chloroprene rubber.

The invention is elucidated on the basis of the following figures, without being restricted thereto.

Figure 3:
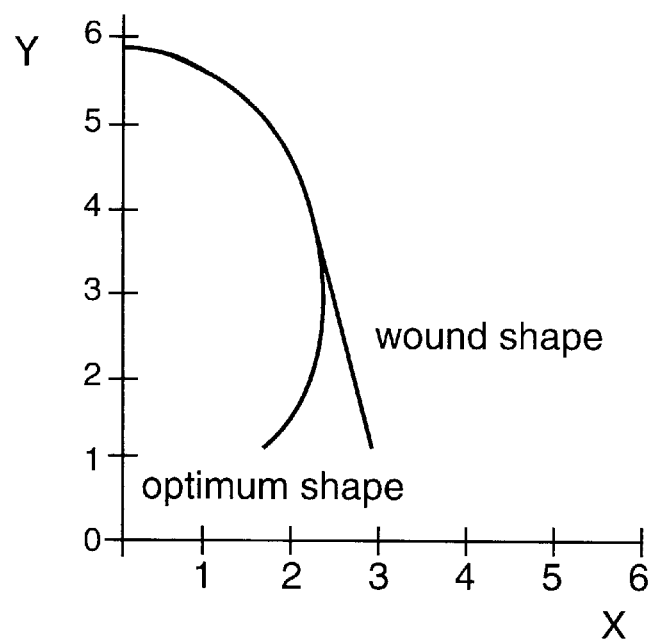

In FIG. 1 the principle equation for designing the vessel, together with a schematic drawing showing some of the variables, is given. In FIGS. $2^{a-c}$ the principle of preparing the shell of the vessel is shown. FIG. 3 gives the X-Y relation in the wound (equilibrium) shape and the final shape, after insertion of the axial member.

In FIG. 4 the construction of part of the assembled vessel with separate axial member is given. The end plate 1, provided with valve 2, is attached by means not shown to axial reinforcement member 3 and to end ring 4. Thereby, a cylindrical enclosure is formed inside the central part of the shell, the rims of which are held in place between the end plate 1 and end ring 4.

FIG. 5 depicts a cross-sectional view of the assembled vessel, in its entirety. As shown, end plates 1 secured to each other through reinforcement members 3 abut against rims on outer surfaces of the vessel. Axial reinforcement members 3, together with both end plates, for a centrally-located co-axially oriented cylindrical structure within the vessel, the vessel having inner lining 5 and outer resin reinforced shell 6. Fill valve 2, through which the vessel can be filled and a degree to which the vessel is filled can be determined, and pressure gauge 7, for measuring pressure of the LPG within the vessel, are mounted to an upper one of end plates 1. The rims are held in place between end plates 1 and end rings 4.

What is claimed is:

1. A wheel-shaped pressure-resistant vessel for storing gaseous or liquid pressurized fuel, the vessel having a substantially rigid shape and comprising:

a substantially continuous fiber-reinforced shell formed of a flexible fiber-reinforced resin;

a central opening;

a gas-tight, substantially rigid inner lining; and an axial reinforcement member, the axial reinforcement member having a device through which the vessel can be filled with the pressurized fuel or emptied of the fuel;

wherein:

the shell has a substantial mechanical equilibrium shape when the vessel is in a non-pressurized condition such that the axial reinforcement member is present in the central opening;

the axial reinforcement member comprises an inner member and two end plates, each of said end plates fixing the shell to the inner member; and the axial reinforcement member is abuttingly attached through the end plates to opposing outer surfaces of the shell such that the outer surfaces of the shell are pulled towards each other, wherein, once the vessel is fully pressurized with the fuel, the shell substantially retains the equilibrium shape.

2. The vessel recited in claim 1 wherein the axial reinforcement member is situated in the central opening of the shell and is attached to rims of the central opening so as to close the central opening.

3. The vessel recited in claim 1 wherein a ratio of a diameter of the central opening to an outer diameter of the vessel lies within a range of greater than or equal to 0.1 but less than 1.0.

4. Use of the vessel recited in claim 1 as an LPG-container for automotive purposes.

5. The vessel recited in claim 1 wherein the axial reinforcement member further comprises means for determining pressure of the fuel contained in the vessel.

6. The vessel recited in claim 1 wherein the axial reinforcement member further comprises means for determining a degree to which the vessel is filled with the fuel.

7. The vessel of claim 1 wherein the fiber reinforced resin comprises an elastomeric resin.

8. The vessel of claim 1 wherein the fiber reinforced resin comprises a non-elastomeric resin.

9. The vessel of claim 1 wherein the fiber reinforced resin comprises a thermoplastic resin.

10. The vessel of claim 9 wherein the fiber reinforced resin comprises a thermoplastic-elastomeric resin.

11. The vessel of claim 1 wherein the fiber reinforced resin comprises a thermosetting resin.

12. The vessel of claim 11 wherein the fiber reinforcement of the shell comprises fibers selected from the group of polyamide fibers, polyolefinic fibers and aramide fibers.

13. The vessel of claim 1 wherein the fiber reinforcement of the shell comprises inorganic fibers.

14. The vessel of claim 1 wherein the fiber reinforcement of the shell comprises carbon fibers.

* * * * *